(12) United States Patent
Hatajima

(10) Patent No.: US 9,920,832 B2
(45) Date of Patent: Mar. 20, 2018

(54) SIGNAL PROCESSING DEVICE FOR ROTATION SENSOR

(71) Applicant: JATCO Ltd, Fuji-shi, Shizuoka (JP)

(72) Inventor: Kouichi Hatajima, Machida (JP)

(73) Assignee: JATCO LTD, Fuji-Shi (JP)

( * ) Notice: Subject to any disclaimer, the term of this patent is extended or adjusted under 35 U.S.C. 154(b) by 203 days.

(21) Appl. No.: 14/914,328

(22) PCT Filed: Jun. 27, 2014

(86) PCT No.: PCT/JP2014/067108
§ 371 (c)(1),
(2) Date: Feb. 25, 2016

(87) PCT Pub. No.: WO2015/029572
PCT Pub. Date: Mar. 5, 2015

(65) Prior Publication Data
US 2016/0215878 A1    Jul. 28, 2016

(30) Foreign Application Priority Data
Aug. 27, 2013  (JP) .................................. 2013-175827

(51) Int. Cl.
*F16H 59/46*        (2006.01)
*F16H 61/662*       (2006.01)
*F16H 61/12*        (2010.01)

(52) U.S. Cl.
CPC ........... *F16H 61/662* (2013.01); *F16H 59/46* (2013.01); *F16H 61/12* (2013.01); *F16H 2059/465* (2013.01); *F16H 2061/1208* (2013.01)

(58) Field of Classification Search
None
See application file for complete search history.

(56) References Cited

U.S. PATENT DOCUMENTS 5,199,399 A * 4/1993 Shibuya ................ B60W 10/06
                                              123/327
5,627,750 A * 5/1997 Kono .................... F16D 48/066
                                              477/176
(Continued)

FOREIGN PATENT DOCUMENTS

JP      63-062954 A     3/1988
JP      2003-106442 A   4/2003
(Continued)

*Primary Examiner* — Justin Holmes
(74) *Attorney, Agent, or Firm* — Foley & Lardner LLP

(57) ABSTRACT

An instantaneous revolution speed Nm of an input shaft is calculated from an input period of a pulse signal from a revolution sensor, a revolution speed Nf is calculated by filter processing the instantaneous revolution speed Nm, a determination is made that a belt slip occurs when, during a stop of a vehicle, a state in which the revolution speed Nf is equal to or higher than a slip determination speed $N_{SL}$ is continued for a time equal to or longer than slip determination time $T_{SL}$, and an immediately prior revolution speed Nf is held until a time of a pulse signal no input exceeds a road wheel lock corresponding time $T_{WL}$ which is longer than a slip determination time $T_{SL}$.

4 Claims, 6 Drawing Sheets

(56) References Cited

U.S. PATENT DOCUMENTS

| | | | | |
|---|---|---|---|---|
| 5,848,370 A | * | 12/1998 | Kozaki | F16H 61/08 |
| | | | | 477/155 |
| 2006/0183581 A1 | | 8/2006 | Iwatsuki et al. | |
| 2011/0077828 A1 | * | 3/2011 | Matsuda | F02D 17/00 |
| | | | | 701/54 |
| 2012/0135829 A1 | * | 5/2012 | Doihara | F16H 61/66272 |
| | | | | 474/28 |
| 2013/0191012 A1 | | 7/2013 | Hirotsu et al. | |

FOREIGN PATENT DOCUMENTS

| | | |
|---|---|---|
| JP | 2003-214905 A | 7/2003 |
| JP | 2005-344860 A | 12/2005 |
| JP | 2013-148110 A | 8/2013 |
| JP | 2013-151175 A | 8/2013 |
| WO | WO-03/027540 A1 | 4/2003 |

* cited by examiner

FIG.2
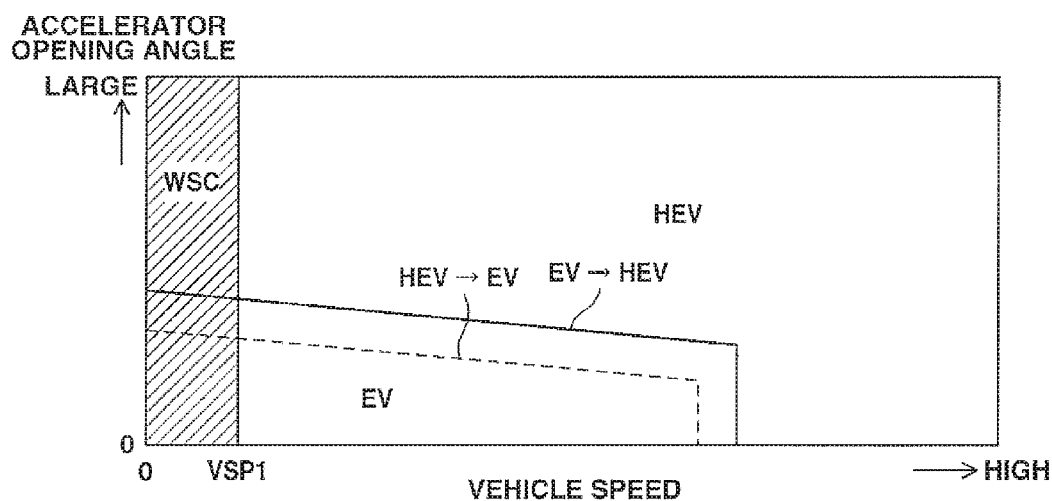
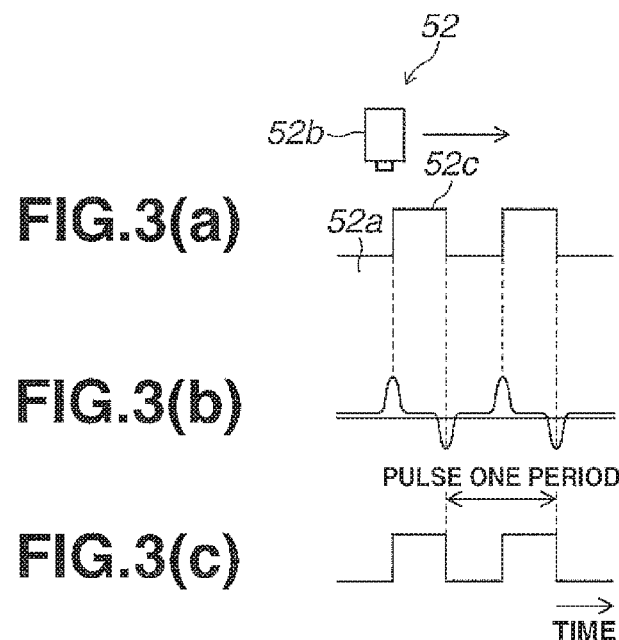
FIG.3(a)
FIG.3(b)
FIG.3(c)

SIGNAL PROCESSING DEVICE FOR ROTATION SENSOR

TECHNICAL FIELD

The present invention relates to a signal processing apparatus of a revolution sensor which detects a revolution of an input shaft of a continuously variable transmission of a vehicle.

BACKGROUND ART

An information of a revolution (a revolution speed, a number of revolutions per unit time, or simply referred to as a revolution number) of an essential part of a power plant such as an engine or a motor and a continuously variable transmission is needed for the control of the power plant and the continuously variable transmission. This revolution is detected by a revolution sensor and is utilized for the control.

For example, in a belt type continuously variable transmission connected to the power plant of an automotive vehicle, an input revolution sensor (a primary revolution sensor) detecting the revolution of a primary shaft and an output revolution sensor (a secondary revolution sensor) detecting the revolution of a secondary shaft are provided, a target gear (shift) ratio is calculated on a basis of an input information including the detection information from these revolution sensors, and a gear shift control is carried out in order for the gear (shift) ratio to become this target gear (shift) ratio.

However, in a case where an abnormality occurs in either or both of the input revolution sensor and the output revolution sensor, if the target gear (shift) ratio is calculated on the basis of the input information including the detection information from these revolution sensors, an appropriate target gear (shift) ratio cannot be obtained and an appropriate gear shift control cannot be achieved. Therefore, when a determination is made that the abnormality occurs in the revolution sensor(s), a fail-safe processing is carried out.

In addition, a lower limit secondary pulley pressure is calculated on a basis of the revolution speed of the primary shaft detected by the input revolution sensor. In a case where the secondary pulley pressure detected by the sensor is lower than the lower limit secondary pulley pressure, the determination is made that, in the primary pulley side, a slip occurs in the belt and a gear (shift) ratio fixture control is carried out.

Incidentally, as the revolution sensor, it is general that a digital encoder constituted by a sensing rotor (a signal rotor) installed on a rotary body such as the primary shaft or the secondary shaft and a sensor installed in a contactless manner against this sensing rotor. A plurality of teeth (projections) are installed on an outer peripheral surface of the sensing rotor. The sensor generates pulse signals corresponding to the teeth of the sensing rotor when the rotary body is revolved. The revolution speed of the rotary body can be obtained from this pulse signals and accompanied timer signals.

However, if the revolution state of the rotary body is tried to be grasped on the basis of the pulse signals, the pulse signals are outputted in response to a slight revolution of the rotary body. The pulse signals are outputted due to noises. In these cases, the revolution state of the rotary body is often erroneously grasped. If the revolution state is erroneously grasped, the control based on the revolution state cannot appropriately be carried out. In addition, an erroneous determination is made that the revolution sensor which is normal in nature has failed.

A technique which focuses on such a respect as described above is disclosed in a patent document 1. This technique is such that, in a case where a revolution pulse is generated by comparing a detection waveform detected by the sensor with a predetermined reference voltage, a switching element which electrically interrupts a high side of a detection element and a predetermined low voltage point of place is installed and, in a case where the revolution detection is not required, the switching element serves to inhibit the revolution detection. Thus, the revolution erroneous detection due to the noises or so forth can be prevented.

Incidentally, in a case where, in the automotive vehicle in which the above-described belt type continuously variable transmission is equipped, the abnormality of the input revolution speed and the slip of the belt are determined, a fail determination logic as will be described below is generally used.

In details, in a case of the determination of the belt slip, the determination is made that the belt slip occurs when, under a situation in which the vehicle is stopped and the primary shaft is stopped, a state in which revolution speed (a post processing revolution speed) Nf which is a filter process of the detection pulse data of the input revolution sensor exceeds a predetermined revolution speed $N_{SL}$ is continued for a time equal to or longer than a predetermined time $T_{SL}$. In addition, for the determination that a line breakage of the input revolution sensor, the determination is made that the line breakage of the input revolution sensor occurs when no input of the pulse is decided after post processing revolution speed Nf exceeds another predetermined revolution speed $N_{SN}$.

However, it is determined that, in such a general fail determination logic as described above, in the automotive vehicle in which the above-described belt type continuously variable transmission is equipped, a case occurs where the erroneous determination is made that the line breakage occurs in spite of the fact that the input revolution sensor is normal and a case occurs where the erroneous determination is made that the belt slip occurs in spite of the fact that no belt slip occurs. In each of the cases, it is determined that an abnormal input of the pulses of the revolution sensor is a cause.

When specifically considered, in a case where, with a clutch connecting the power plant with the continuously variable transmission separated, the power plant is driven, the input revolution sensor of the primary shaft is, sometimes, responded to output short period pulses although the primary shaft is, in nature, in the stopped state. In this case, an instantaneous revolution speed Nm of the primary shaft often becomes an extremely high revolution speed from the short period of the pulses. Thereafter, the pulses are not inputted from the input revolution sensor. However, a function which holds post processing revolution speed Nf, equipped in the vehicle, (a function which holds an immediately before revolution speed in a revolution pulse no input state of a tire lock) is operated to hold post processing revolution speed Nf of the primary shaft calculated immediately before until another predetermined time $T_{WL}$ (in general, $T_{WL} > T_{SL}$) has passed.

Consequently, when a state in which post processing revolution speed Nf caused by the above-described short period pulses exceeds predetermined revolution speed $N_{SN}$ is continued equal to or longer than predetermined time $T_{SL}$, the determination is made that the belt slip occurs. In addition, there is a case where post processing revolution speed Nf caused by the above-described short period pulses exceeds predetermined revolution speed $N_{SN}$. Hence, thereafter, when no input of the pulses is determined, the determination is made that the line breakage of the input revolution sensor occurs. Therefore, such erroneous determinations as described above are desired to be avoided.

In the technique described in patent document 1, the revolution detection is inhibited according to necessity. Hence, a condition setting to inhibit the revolution detection is not easy. In addition, when a hardware structure of the apparatus is added in such a way that the switching element is newly added, a rise of a cost will be introduced. Hence, while the rise of the cost is suppressed, the avoidance of the erroneous determinations is desired to be achieved.

PRE-PUBLISHED DOCUMENT

Patent Document

Patent document 1: A Japanese Patent Application First Publication (Tokkai) No. 2003-214905.

DISCLOSURE OF THE INVENTION

With the above-described problem in mind, it is an object of the present invention to provide a signal processing apparatus of a revolution sensor which is capable of avoiding an erroneous determination that a line breakage occurs in spite of the fact that a sensor which detects an input revolution of a belt type continuously variable transmission connected to a power plant via a clutch is normal and an erroneous determination that a belt slip occurs in spite of the fact that the belt slip does not occur, without introduction of an increase of a cost of the apparatus.

The signal processing apparatus of the revolution sensor according to the present invention is created in order to achieve the above-described object. According to one aspect of the present invention, there is provided a signal processing apparatus of a revolution sensor for processing a pulse signal inputted from the revolution sensor, the signal processing apparatus being equipped in a vehicle having a power plant, a belt continuously variable transmission whose input shaft is interruptibly connected to the power plant via a clutch, the revolution sensor detecting a revolution of the input shaft, and slip determining means for determining a belt slip occurs in the belt continuously variable transmission when, during a stop of the vehicle, a state in which a revolution speed of the input shaft is equal to or higher than a slip determination speed $N_{SL}$ is continued for a time equal to or longer than a slip determination time $T_{SL}$ and the signal processing apparatus comprising:

instantaneous revolution speed calculating means for calculating an instantaneous revolution speed Nm of the input shaft from a period in which the pulse signal is inputted;

revolution speed calculating means for smoothing the instantaneous calculating speed Nm through a filter processing to calculate the revolution speed Nf;

time calculating means for calculating an elapsed time from a no input state of the pulse signal to an input state of the pulse signal in a case where the pulse signal becomes no input continuously for a no input state determination time $T_{N1}$;

instantaneous revolution speed determining means for comparing the instantaneous revolution speed Nm with a first reference speed $N_{S1}$ which is a vicinity speed of the slip determination speed $N_{SL}$ and a second reference speed $N_{S2}$ which is higher than the first reference speed $N_{S1}$; and calculation operating means for operating a calculation of the revolution speed calculating means on a basis of the elapsed time and instantaneous revolution speed Nm during a release of the clutch, wherein the calculation operating means, after a time at which the elapsed time has reached to a reference time $T_{S1}$, holds an immediately prior revolution speed Nf to the revolution speed calculating means until a continued time of a no input exceeds a road wheel lock corresponding time $T_{WL}$ set to correspond to a road wheel lock and which is longer than the slip determination time $T_{SL}$ when the no input of the pulse signal occurs and, when the continued time of the no input exceeds the road wheel lock corresponding time $T_{WL}$, carries out a road wheel lock corresponding process in which 0 as the instantaneous revolution speed Nm is inputted to the revolution speed calculating means, while the elapsed time has reached to reference time $T_{S1}$, carries out the road wheel lock corresponding process in a case where the determining means determines that the instantaneous revolution speed Nm is in a zone equal to or lower than first reference speed $N_{S1}$, inputs 0 as the instantaneous revolution speed Nm to the revolution speed calculating means when the no input of the pulse signal occurs in a case where the determining means determines that the instantaneous revolution speed Nm is in a zone between the first reference speed $N_{S1}$ and the second reference speed $N_{S2}$, and holds a value of the revolution speed Nf calculated immediately before to the revolution speed calculating means in a case where the determining means determines that the instantaneous revolution speed Nm is in a zone equal to or higher than the second reference speed $N_{S2}$.

It is preferable that the reference time $T_{S1}$ is set to include a time range in which the pulse signal of a short period which is generated when, during a release of the clutch, the input shaft is instantaneously revolved by a minute quantity when an abrupt variation of a torque of the power plant is transmitted to the input shaft can be generated, the first reference speed $N_{S1}$ is set to be higher than the slip determination speed $N_{SL}$ by a minute quantity, and the second reference speed $N_{S2}$ is set on a basis of a maximum value of the instantaneous revolution speed Nm which can be generated in a case where the input shaft is ordinarily started to be revolved upon receipt of the torque of the power plant.

It is preferable that the signal processing apparatus further comprises line breakage determining means for determining that a line breakage occurs in the revolution sensor when the no input state of the pulse signal is decided from a time at which the revolution speed exceeds a line breakage determination revolution speed $N_{SN}$ and the second reference revolution speed $N_{S2}$ set to be higher than the line breakage determination revolution speed $N_{SN}$ and is set in such a way that the revolution speed Nf obtained by filter processing the instantaneous revolution speed Nm through the revolution speed calculating means based on the pulse signal of the short period generated when, during the release of the clutch, the abrupt variation of the torque of the power plant is transmitted to the input shaft and the input shaft is instantaneously revolved by the minute quantity becomes equal to or lower than the line breakage determination revolution speed $N_{SN}$.

It is preferable that the power plant includes an engine for which an internal combustion engine is used and an electric motor connected to the engine via a first clutch and a second clutch as the clutch is intervened between an output shaft of the electric motor and the input shaft of the belt continuously variable transmission, the first clutch and the second clutch having a slip engagement mode in addition to an engagement mode and a release mode.

In the signal processing apparatus of the revolution sensor according to the present invention, the following effects can be obtained.

In a case where revolution speed Nf of the input shaft (the primary shaft) of the belt type continuously variable transmission of the vehicle is calculated, generally, the process corresponding to the road wheel lock is carried out. In details, during the road wheel lock, the pulse signal is no input. If the no input of the pulse signal is directly utilized for the calculation of revolution speed Nf through the revolution speed calculating means, the influence is given on the determination and the control based on revolution speed Nf. Hence, if the continuation of the no input of the pulse signal is within the predetermined time (road wheel lock corresponding time) $T_{WL}$, the road wheel lock corresponding process in which revolution speed Nf immediately before the no input of the pulse signal is held is carried out. Thus, the influence on the determination and the control based on revolution speed Nf is avoided.

On the other hand, if, even during the release of the clutch, the abrupt variation of the torque at the power plant side occurs, this torque abrupt variation is transmitted to the input shaft and the input shaft is minutely revolved (a rattling of the primary shaft). Then, the pulse signal of the short period is instantaneously generated and inputted from the revolution sensor. The revolution speed calculating means calculates revolution speed Nf by smoothing instantaneous revolution speed Nm calculated from the period in which the pulse signal is inputted through the filter processing. Even though a slight number of pulses is in the pulse signal and the period of the pulse signal is extremely short, the instantaneous revolution speed Nm becomes excessive in spite of the fact that the input shaft is actually not revolved. Thus, the revolution speed Nf becomes accordingly high (large). When the value of the revolution speed Nf becomes large, the influence on the determination and control based on this revolution speed Nf is given.

Since the input of the pulse signal due to the abrupt variation of the torque of the power plant is instantaneous, the limitation is placed on the elapsed time from a time at which the pulse signal is switched from the no input state to the input state which reaches to reference time $T_{S1}$.

In a case where the input shaft is ordinarily started to revolve upon receipt of the torque of the power plant, the pulse signal falls in the input state from the no input state. In this case, it is considered that the instantaneous revolution speed immediately after the input state falls within a constant value (second reference speed $N_{S2}$). Thus, when the instantaneous revolution speed becomes equal to or higher than second reference speed $N_{S2}$, the determination is made that the input of the pulse signal occurs due to the abrupt variation of the torque. At this time, this instantaneous revolution speed Nm is not counted in the calculation of revolution speed Nf and the immediately prior value of revolution speed Nf is held. Thus, the erroneous calculation of the excessive revolution speed Nf can be prevented. The influence on the determination and control based on the revolution speed Nf can be avoided.

If instantaneous revolution speed Nm is smaller (lower) than second reference speed $N_{S2}$, the instantaneous revolution speed Nm cannot be divided into the case due to the pulse signal caused by the abrupt variation of the torque or the case due to the input shaft started to revolve. In a case of the pulse signal due to the abrupt variation of the torque, the pulse signal of the short period is inputted and, thereafter, the pulse signal is in the no input state. Then, if the road wheel lock corresponding process is carried out, the immediately prior revolution speed Nf is held for the wheel lock corresponding time $T_{WL}$. Hence, during the stop of the vehicle, the state in which the revolution speed Nf of the input shaft is equal to or higher than slip determination speed $N_{SL}$ is continued for a time equal to or longer than slip determination time $T_{SL}$. Thus, the erroneous determination that the belt slip occurs is made. However, at this time, the road wheel lock corresponding process is not carried out. When no input of the pulse signal occurs, 0 as instantaneous revolution speed Nm is instantaneously inputted into the revolution speed calculating means. Thus, the erroneous determination of the belt slip can be avoided.

It should be noted that, when no input state of the pulse signal is decided from a time at which revolution speed Nf exceeds line breakage determination revolution speed $N_{SN}$, the determination is made that the line breakage occurs in the revolution sensor. Thus, the line breakage of the revolution sensor can be determined. If the pulse signal due to the above-described torque abrupt variation is generated, the pulse signal is used for the calculation of the revolution speed calculating means provided that instantaneous revolution speed Nm is lower than second reference revolution speed $N_{S2}$. The instantaneous revolution speed Nm gives 0 and this state is continued after instantaneous revolution Nm is largely generated. Thus, the revolution speed Nf calculated by the revolution speed calculating means is limited. The value of second reference revolution speed $N_{S2}$ is set in such a way that the revolution speed calculated by the revolution speed calculating means becomes smaller than line breakage determination revolution speed $N_{SN}$. Thus, the erroneous determination of the line breakage caused by the pulse signal generated due to the abrupt variation of the torque can be avoided.

BRIEF DESCRIPTION OF THE DRAWINGS

FIG. 2 is an example of a mode switching map of the hybrid vehicle.

FIGS. 3(a), 3(b), and 3(c) are explanatory views of an example of the revolution sensor, FIG. 3(a) being a schematic view of the revolution sensor, FIG. 3(b) being a view representing a variation of an output voltage in a case where a sensor element is an electromagnetic pick-up, and FIG. 3(c) being a view representing a pulse signal based on the output voltage.

EMBODIMENTS FOR CARRYING OUT THE INVENTION

Hereinafter, a preferred embodiment according to the present invention will be explained on a basis of the drawings. It should be noted that the preferred embodiment described below is merely an illustration. Various modifications and applications of a technique are not excluded.

First, a drive train of a hybrid automotive vehicle (simply referred to as a vehicle) in the preferred embodiment will be described.

Figure 1:
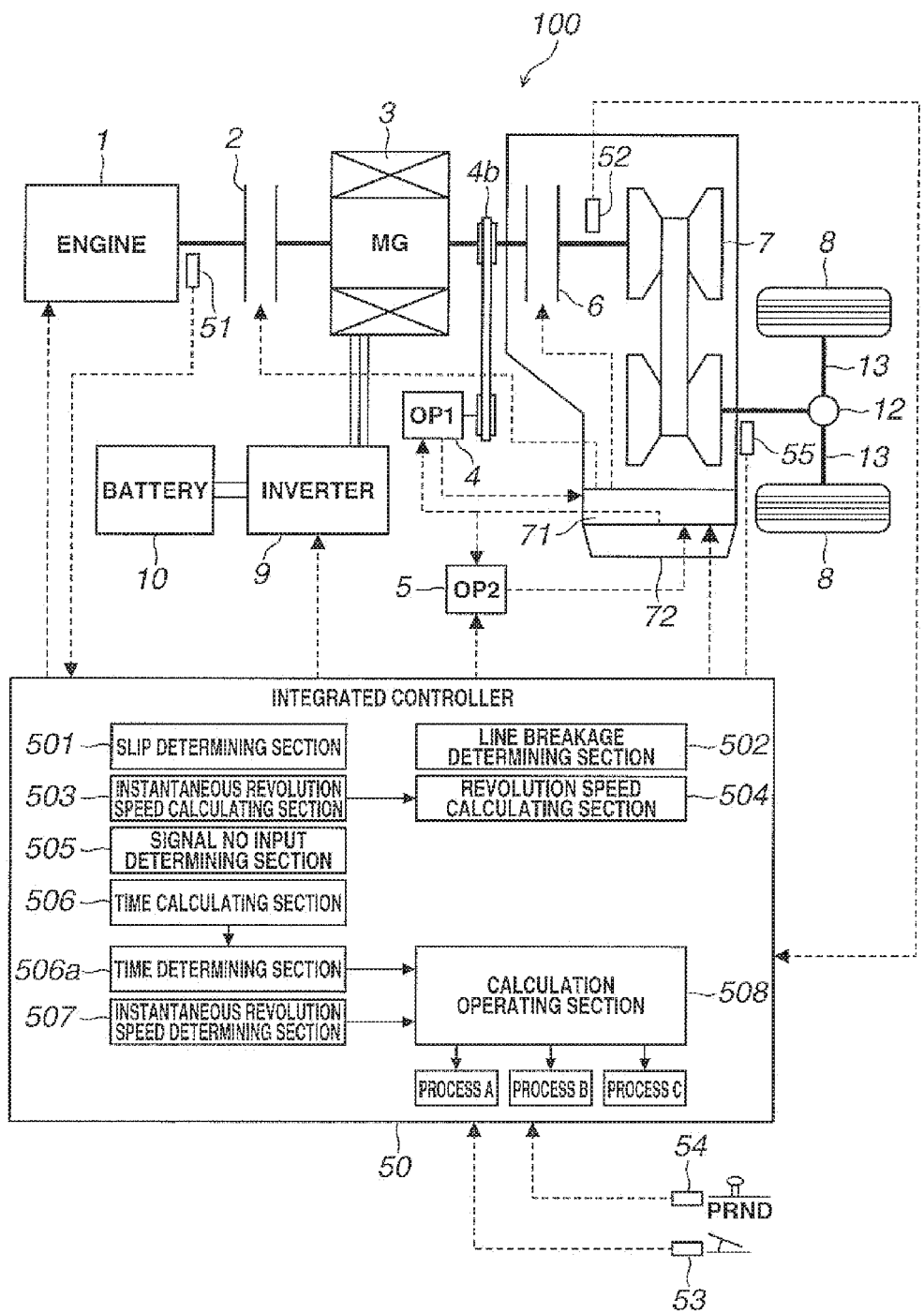
FIG. 1 is a configuration view of a drive train of as a hybrid vehicle to which a signal processing apparatus of a revolution sensor in a preferred embodiment is applied.

As shown in FIG. 1, vehicle 100 in the preferred embodiment includes: an engine 1 (an internal combustion engine is used); a first clutch 2; a motor generator (hereinafter, also called MG) 3 which also functions as an electrically driven motor (motor); a first oil pump 4; a second oil pump 5; a second clutch 6; a continuously variable transmission (hereinafter, also called CVT) 7; drive wheels 8; and an integrated controller 50. It should be noted that engine 1 and MG3 are also generally called as a power plant.

Engine 1 is the internal combustion engine such as a gasoline engine or a diesel engine. On a basis of engine control commands from integrated controller 50, a fuel injection quantity, an intake air quantity, and so forth are adjusted to control a revolution speed or torque of the engine.

First clutch 2 is a normal open hydraulic pressure type clutch intervened between engine 1 and MG3. An engagement and a release of first clutch 2 are controlled by a hydraulic pressure whose pressure is regulated by a hydraulic pressure control valve unit 71 with a drain pressure of first oil pump 4 or second oil pump 5 as an original pressure on a basis of commands from integrated controller 50. For example, a dry type multiple plate clutch is used for this first clutch 2.

MG3 is arranged in series with engine 1 and is a synchronous type rotary electric machine having a rotor in which permanent magnets are buried and a stator on which a stator coil is wound. MG3 is controlled by applying a three phase alternating current produced by an inverter, on a basis of the commands from integrated controller 50. MG3 can be operated as the electrically driven motor which revolves upon receipt of an electric power from a battery 10. In addition, MG3 functions as a generator which generates an electromotive force on both ends of the stator coil when the rotor receives a revolution energy from engine 2 and drive wheels 8. The generated electric power can charge battery 10.

First oil pump 4 is a vane pump operated by transmitting the revolution of MG3 via a belt 4b. First oil pump 4 sucks a working oil reserved in an oil pan 72 and supplies the hydraulic pressure to a hydraulic pressure control valve unit 71.

Second oil pump 5 is an electrically driven oil pump which operates upon receipt of the power supply from battery 10. Second oil pump 5 is driven in a case where an oil quantity becomes insufficient only from first oil pump 4 on a basis of the commands from integrated controller 50. In the same way as first oil pump 4, second oil pump 5 sucks the working oil reserved in oil pan 72 of CVT 7 and supplies the hydraulic pressure to hydraulic pressure control valve unit 71.

Second clutch 6 is intervened between MG3 and CVT7. The engagement and release of second clutch 6 are controlled by the hydraulic pressure regulated by hydraulic pressure control valve unit 71 with the drain pressure of first oil pump 4 or second oil pump 5 as the original pressure on a basis of the commands from integrated controller 50. For example, a normal open wet type multiple plate clutch is used for this second clutch 6.

CVT 7 is disposed at a downstream side of MG3 and a gear shift ratio (or a speed ratio) of CVT 7 can be modified in a stepless manner in accordance with a vehicle speed, an accelerator opening angle, and so forth. This CVT 7 includes: a primary pulley; a secondary pulley; and a belt stretched between these pulleys. A primary pulley pressure and a secondary pulley pressure are produced by hydraulic pressure control valve unit 71 with the drain pressures of first oil pump 4 and second oil pump 5 as the original pressure. A movable pulley of the primary pulley and the movable pulley of the secondary pulley are moved in an axial direction by means of the respective pulley pressures and by varying a pulley contact radius of the belt so that the gear shift ratio (speed ratio) is modified steplessly.

A differential 12 is connected to an output shaft of CVT7 via a final speed reduction gear mechanism not shown. Left and right drive wheels 8 are connected to differential 12 via a drive shaft 13.

Integrated controller 50, although not shown, includes: an input unit; an output unit; a storage unit (ROM, RAM, BURAM, and so forth) in which a multiple number of control programs are incorporated; a Central Processing Unit (CPU); and a timer counter. Integrated controller 50 is also called an electronic control unit (ECU: an Electric Control Unit).

This integrated controller 50 receives signals from a revolution sensor 51 which detects a revolution speed of engine 1, from a revolution sensor 52 which detects an output revolution speed (=an input revolution speed of CVT7) of the second clutch, from an accelerator opening angle sensor 53 which detects an accelerator opening angle, from an inhibitor switch 54 which detects a select position of CVT 7 (a state of a select lever or select switch which switches a forward, reverse, neutral, parking, and so forth), and from a vehicle speed sensor 55 which detects a vehicle speed. Integrated controller 50 performs the control over engine 1, MG3 (inverter 9), and CVT7 on a basis of these input signals.

It should be noted that vehicle speed sensor 55 also functions as the output revolution sensor which detects the output revolution speed of CVT7. In addition, since the revolution speeds detected by revolution sensors 51, 52, and 55 are written by the number of the revolutions per unit time, the revolution speeds are simply referred to as number of revolutions.

Integrated controller 50 refers to a mode switching map shown in FIG. 2 and switches between EV mode and HEV mode as a driving mode of vehicle 100. The EV mode is a traveling mode in which first clutch 2 is released and only MG3 is a drive source. This EV mode is selected when a demanded driving force is low and a charge quantity of battery 10 is sufficiently present.

HEV mode is a traveling mode in which first clutch 2 is engaged and engine 1 and MG3 are drive sources. This HEV mode is selected when the demanded driving force is high or the charge quantity of battery 10 is insufficient. It should be noted that the switching line from the EV mode to the HEV mode is set at a higher speed side and at a larger accelerator opening angle side than the switching line from the HEV mode to the EV mode.

In addition, vehicle 100 is not equipped with a torque converter. In a WSC (Wet Start Clutch) region shown in FIG. 2, a WSC control is performed in which a start and stop are carried out while second clutch 6 is slipped. The WSC region is a low vehicle speed region in which the vehicle speed is equal to or lower than a predetermined vehicle speed VSP1 during the vehicle start or deceleration stop time. The VSP1 is, for example, 10 Km/h.

Specifically, in a case where the select position of CVT 7 is switched from a non-traveling position (N, P and so forth) to the traveling position (D, R, and so forth) and vehicle 100 is started, integrated controller 50 gradually raises the hydraulic pressure supplied to second clutch 6 and gradually engages second clutch 6 while slips second clutch 6. Then, when the vehicle speed reaches to VSP1, integrated controller 50 completely engages second clutch 6 and the WSC control is finished.

In addition, in a case where the select position of CVT 7 is in the traveling position (D, R, and son forth) and vehicle 100 is traveling, vehicle 100 is decelerated and the vehicle speed is reduced to VSP1, integrated controller 50 gradually reduces the hydraulic pressure supplied to second clutch 6 and gradually releases second clutch 6 while slipping second clutch 6. Then, when the vehicle 100 is stopped, integrated controller 50 completely releases second clutch 6 and finishes the WSC control.

In such a vehicle 100 as described above, attention is paid to CVT7. Integrated controller 50 calculates a target gear shift ratio (a target speed ratio) on a basis of the input information including input revolution speed of CVT7 detected by revolution sensor 52 (also called input revolution sensor) and the output revolution speed of CVT 7 detected by vehicle speed sensor (also called output revolution sensor) 55 and performs a gear shift control of CVT7 in order for the gear shift ratio to become this target gear shift ratio.

However, in a case where an abnormality occurs in either of input revolution sensor 52 and output revolution sensor 55, the target gear shift ratio is calculated on a basis of the input information including the detection information from these sensors 52, 55. At this time, an appropriate target gear shift ratio cannot be obtained. When the abnormality occurs in revolution sensors 52, 55 on a basis of the information from revolution sensors 52, 55, integrated controller 50 determines a revolution sensor abnormality and carries out a fail-safe process. In addition, a determination of a belt slip is made on a basis of the information from input revolution sensor 52 and output revolution sensor 55 and a slip avoidance process such as a gear shift ratio fixture control for the belt slip is carried out.

For example, integrated controller 50 includes: a slip determining section (slip determining means) 501 configured to determine the belt slip on a basis of the information from revolution sensor 52 and a count information from a timer; and a line breakage determining section (line breakage determining means) 502 configured to determine a line breakage of revolution sensor 52 on a basis of the information from revolution sensor 52 and no input state determination information of the pulse signal.

Integrated controller 50, in order to provide an information for slip determining section 501 and line breakage determining section 502, includes: an instantaneous revolution speed calculating section (instantaneous revolution speed calculating means) 503 configured to calculate an instantaneous revolution speed Nm at a time point for each calculation cycle on a basis of the information from revolution sensor 52; a revolution speed calculating section (revolution speed calculating means) 504 configured to calculate a revolution speed (also called, a post processing revolution speed) Nf by smoothing instantaneous revolution speed Nm calculated by instantaneous revolution speed calculating section 503 through a filter processing; a signal no input determining section (signal no input determining means) 505 configured to determine no input state in a case where the pulse signal is no input continued for a no input determination time $T_{NI}$; and a calculation operating section (calculation operating means) 508 configured to operate a calculation through revolution speed calculating section 504.

It is general that revolution sensor 52, as schematically shown in FIG. 3(a), is a digital encoder constituted by a sensing rotor (a signal plate) 52a installed on the primary shaft and a sensor 52b arranged in a contactless manner against this sensing rotor 52a. A plurality of teeth (projections) 52c are installed on an outer peripheral surface of sensing rotor 52a. Sensor 52b generates the pulse signal corresponding to a tooth 52c of sensing rotor 52a when the primary shaft is revolved. In a case where sensor 52b is an electromagnetic pick up, as shown in FIG. 3(b), variations of the output voltage occurs when sensor 52b passes a tooth revolution direction start end of tooth 52c and sensor 52b passes a tooth revolution direction final end of tooth 52c. On a basis thereof, the pulse signal as shown in FIG. 3(c) is obtained.

Instantaneous revolution speed calculating section 503 processes the pulse signal from revolution sensor 52 inputted to integrated controller 50 and calculates instantaneous revolution speed Nm. In details, instantaneous revolution speed calculating section 503 calculates one period of the pulse signal shown in FIG. 3(c), for example, a time (a period) from a certain rise part to a subsequent rise part, and divide an angle corresponding to one period of tooth 52c of sensing rotor 52a by a period time so that instantaneous revolution speed Nm corresponding to one period of revolution sensor 52 can be obtained.

The revolution speed calculating section 504 calculates revolution speed Nf by smoothing instantaneous revolution speed Nm through a filter processing, for example, shown in the following equation (1). It should be noted that Nf(n−1) denotes the revolution speed of a previous calculation period, Nm(n) denotes the instantaneous revolution speed of the present calculation period, Nf(n) denotes the revolution speed of the present calculation period, and a and b denote filter coefficients.

$$Nf(n)=a\ Nm(n)+bNf(n-1) \qquad (1)$$

wherein a+b=1

Signal no input determining section 505 determines that no input state occurs in a case where the no input state of the pulse signal is continued for no input determination time $T_{NI}$. This copes with a case where the pulse signal detected due to the influence of noises or so forth is instantaneously no input. In order to eliminate a case where the instantaneously no input occurs, signal no input determining section 505 determines that the pulse signal is in no input state in a case where a no input state of the pulse signal is continued for no input determination time $T_{NI}$.

Calculation operating section 508 operates the calculation through revolution speed calculating section 504 according to an elapsed time from the no input state to the input state and the determination based on the instantaneous revolution speed when second clutch 6 is released. Thus, integrated controller 50 includes: a time calculating section (time calculating means) 506 configured to calculate an elapsed time from a time point at which the input state of the pulse signal occurs from no input state; a time calculating section (time determining means) 506a configured to determine whether the elapsed time has reached to a first reference time $T_{S1}$; and an instantaneous revolution speed determining section (instantaneous revolution speed determining means) 507 configured to compare and determine instantaneous revolution speed Nm with a first reference speed $N_{S1}$ and a second reference speed $N_{S2}$.

Time calculating section 506 calculates the elapsed time from a time point at which the pulse signal input occurs under a condition that signal no input determining section 505 determines that no input state occurs.

Time determining section 506a determines whether the elapsed time calculated by time calculating section 506 has reached to a reference time $T_{S1}$.

Instantaneous revolution speed determining section 507 compares and determine instantaneous revolution speed Nm calculated by instantaneous revolution speed calculating section 503 with first reference speed $N_{S1}$ and second reference speed $N_{S2}$. It should be noted that first reference speed $N_{S1}$ is set to a vicinity speed of slip determination speed $N_{SL}$ and second reference speed $N_{S2}$ is set to a higher value than first reference speed $N_{S1}$.

It should, herein, be noted that first reference speed $N_{S1}$ is set to a speed value slightly higher than slip determination speed $N_{SL}$. In addition, second reference speed $N_{S2}$ is set to a speed value largely higher than slip determination speed NSL and is set to a speed value higher than a line breakage determination revolution speed $N_{SN}$ as will be described later. These will be described later.

Figure 4:
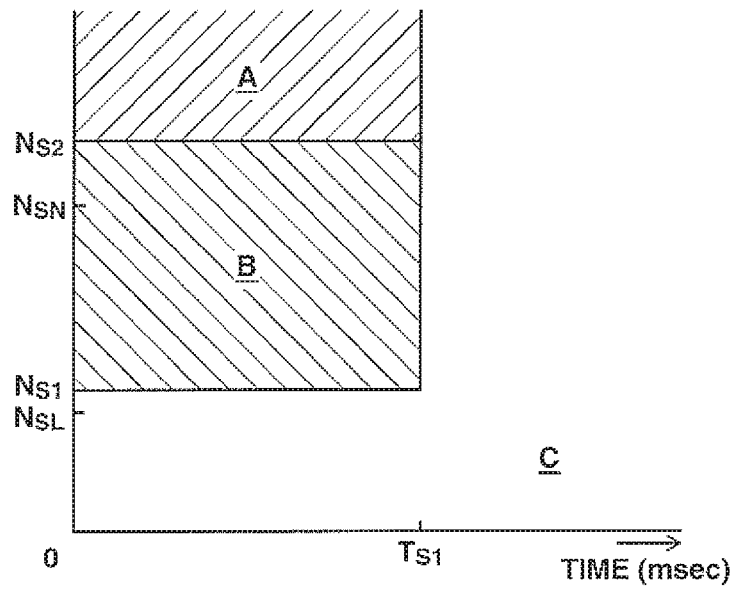
FIG. 4 is an example of a process division map of a signal processing of the revolution sensor in the preferred embodiment.

FIG. 4 is an example of a process division map classifying a division of the signal processing according to determination results of time determining section 506a and instantaneous revolution speed determining section 507. As shown in FIG. 4, the process division is classified into three zones, namely, a zone A in which the elapsed time before reaches to first reference time $T_{S1}$ and instantaneous revolution speed Nm is equal to or higher than second reference speed $N_{S2}$, a zone B in which the elapsed time before reaches to first reference time $T_{S1}$ and instantaneous revolution speed Nm is between first reference speed $N_{S1}$ and second reference speed $N_{S2}$, and another zone C. Zone C includes: a zone in which instantaneous revolution speed Nm is equal to or lower than first reference speed $N_{S1}$ although the elapsed time before reaches to first reference time $T_{S1}$; and a zone in which after the elapsed time has reached to first reference time $T_{S1}$.

In a case where the elapsed time and instantaneous revolution speed Nm fall in zone A, calculation operating section 508 carries out a process A in which a value of revolution speed Nf calculated at an immediately prior period is held by revolution speed calculating section 504. In addition, in a case where the elapsed time and instantaneous revolution speed Nm fall in zone B, calculation operating section 508 carries out a process B in which a value of 0 as instantaneous revolution speed Nm is inputted to revolution speed calculating section 504 without wait for the determination of no input state when no input of the pulse signal occurs. In a case where the elapsed time and instantaneous revolution speed fall in zone C, an ordinary process is carried out in revolution speed calculating section 504.

It should, herein, be noted that the ordinary process is to carry out a road wheel lock corresponding process. That is to say, the ordinary process is such that, when no input of the pulse signal occurs, immediately prior revolution speed Nm is held by revolution speed calculating section 504 until a continued time of this no input exceeds a road wheel lock corresponding time $T_{WL}$ longer than slip determination time $T_{SL}$ and the value of 0 as instantaneous revolution speed Nf is inputted to revolution speed calculating section 504 when the continued time of this no input exceeds road wheel lock corresponding time $T_{WL}$.

Hereinbelow, the reason that calculation operating section 508 operates the calculation by means of revolution speed calculating section 504 in accordance with the elapsed time and instantaneous revolution speed Nm will be explained. This is caused by the slip determination and the line breakage determination. First, these determinations by slip determining section 501 and line breakage determining section 502 will be explained.

In slip determining section 501, a general fail determination logic is used. When vehicle 100 is stopped (it can be determined from output 0 of revolution sensor 55), a state in which revolution speed Nf of the input shaft (primary shaft) of CVT 7 detected by revolution sensor 52 is equal to or higher than slip determination speed $N_{SL}$ is continued for a time equal to or longer than slip determination time $T_{SL}$. At this time, slip determining section 501 determines that the belt slip occurs in CVT7.

A general fail determination logic is also used in line breakage determining section 502. When no input state of the pulse signal from revolution sensor 52 is determined from a time at which revolution speed Nf detected by revolution sensor 52 exceeds line breakage determination revolution speed $N_{SN}$, line breakage determining section 502 determines that the line breakage occurs in revolution sensor 52. For the determination of a decision of no input state, the same logic of the determination of the no input state described above is used. In a case where the state of no input of the pulse signal is continued for a no input decision determination time $T_{NU}$, a decision is made that no input state occurs. It should be noted that no input decision determination time TNT) may be set to a value equal to no input determination time $T_{NI}$ described above or may be set to a time longer than no input determination time $T_{NI}$ in order to take the utmost care for the line breakage determination.

However, it was determined that, in such a fail determination logic as described above, when an abnormal input of the pulse of revolution sensor 52 occurs, an erroneous determination that the line breakage occurs in spite of the fact that revolution sensor 52 is normal is made and another erroneous determination that the belt slip occurs in spite of the fact that the belt slip does not occur is made.

Figure 5:
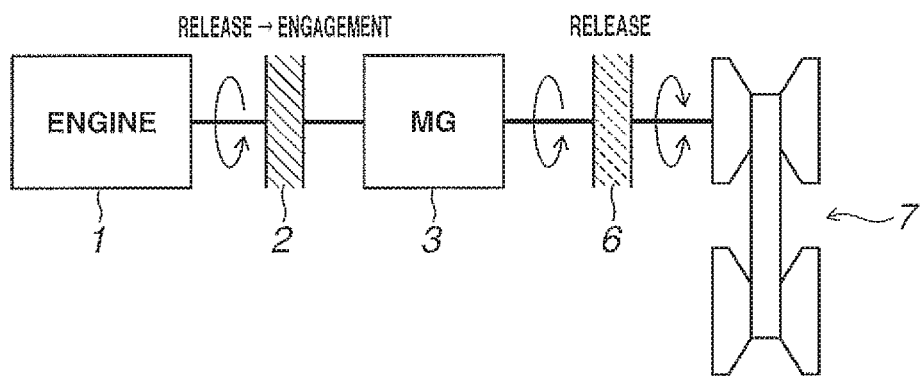
FIG. 5 is a configuration view of an essential part of a drive train in the preferred embodiment.

This situation occurs, as schematically shown in FIG. 5, an abrupt variation of the torque occurs in engine 1 and MG3 (power plant), with second clutch 6 which connects MG3 and CVT7 released. Causes of the abrupt variation of the torque of the power plant are a case where an input torque of engine 1 is suddenly added to the input side of second clutch 2 due to the engagement of first clutch 2 from the released state and a case of a generation of a drag torque generated when the engine is completely exploded when the stopped engine 1 is started with MG3 operated as a starter motor.

When, even if second clutch 6 is released, a large drag torque is instantaneously generated at the input side (power plant side) of second clutch 6, a vibration is propagated at an output side of second clutch 6 and sensing rotor 52*b* mounted on the input shaft (primary shaft) of CVT7 which is the output side of second clutch 6 is swinging back operated such as a slight revolution or a reverse revolution. The swinging back operation of sensing rotor 52*b* is high speed although minute. Hence, the pulse signal of one period is inputted from revolution sensor 52 in an extremely short time (a short period).

As the period of the pulse signal becomes shorter, instantaneous revolution speed Nm calculated by instantaneous revolution speed calculating section 503 becomes higher. The number of pulses of the pulse signal from revolution sensor 52 due to the swinging back operation of sensing rotor 52*b* are slight and, thereafter, a state in which the pulse signal is not inputted (no input state) is continued. Therefore, the filter processing by means of revolution speed calculating section 504 causes post processing revolution speed Nf to be smaller than instantaneous revolution speed Nm. Even if the slight pulse signal occurs, the pulse signal is extremely in the short period. At this time, instantaneous revolution sped Nm becomes extremely high speed and post processing revolution speed Nf becomes high speed.

In the ordinary control, when no input of the pulse signal from revolution sensor 52 occurs, immediately prior revolution speed Nf is held until a continued time of this no input exceeds a road wheel lock corresponding time $T_{WL}$ set to correspond to a road wheel lock. At a time point at which instantaneous revolution speed Nm provides a high value, post processing revolution speed Nf also provides the high value and often exceeds a line breakage determination revolution speed $N_{SN}$. Thereafter, since no input of the pulse signal is continued, post processing revolution speed Nf keeps the high value and no input is decided when no input of the pulse signal exceeds the road wheel lock corresponding time $T_{WL}$. This situation conforms to the line breakage determination condition by means of line breakage determining section 502. Hence, the erroneous determination is made that the line breakage occurs in spite of the fact that the line breakage of revolution sensor 52 does not occur.

In addition, when the holding of revolution speed Nf corresponding to the road wheel lock is carried out during the stop of vehicle 100, the state in which revolution speed Nf is slip determination speed $N_{SL}$ is held by road wheel lock corresponding time $T_{WL}$. Ordinarily, since road wheel lock corresponding time $T_{WL}$ is set to be longer than slip determination time $T_{SL}$, the state in which revolution speed Nf of the input shaft (primary shaft) of CVT7 during the stop of vehicle 100 is equal to or higher than slip determination speed $N_{SL}$ is continued for a time equal to or longer than slip determination time $T_{SL}$. Since this conforms to the belt slip determination condition by means of slip determining section 501, the erroneous determination is made that the belt slip occurs in CVT7 in spite of the fact that the belt slip does not occur.

Thus, with attention paid to a characteristic such that the pulse signal from revolution sensor 52 due to the swinging back operation of such a sensing rotor 52*b* as described above is inputted, the input of the pulse signal is divided into such a special cause and the other cause and divided into a situation of the erroneous determination and a situation of not the erroneous determination. Only in a necessary case, calculation operating section 508 operates the calculation by the revolution speed calculating section 504.

First, a reference time $T_{S1}$ prescribed from a elapsed time from a time at which the signal input is present for zone A and zone B is set to include a time range in which such a pulse signal as described above can be generated on a basis of a time characteristic such that the input of the pulse signal in the short period from revolution sensor 52 which is generated due to the instantaneous revolution by a minute quantity according to the swinging back operation of the above-described sensing rotor 52*b* is a short time.

In other words, it is determined from an actual machine test that the input of such a pulse signal as described is instantaneous and it is limited within a time of approximately 20 msec. Therefore, on a basis of a time supposed that the input of such a pulse signal as described above occurs, reference time $T_{S1}$ is set, for example, by multiplying a safety factor f by the supposed time or adding a margin value α. For example, if the input supposed time is 20 msec, safety factor f is 2, and margin value α is 10 msec, reference time TS1 gives 50 msec (=20 msec×2+10 msec).

Next, for zone A and zone B, a first reference speed $N_{S1}$ and a second reference speed $N_{S2}$ which are prescribed for instantaneous revolution speed Nm are set to correspond to the above-described fail determination. In details, first reference speed NS1 is set to be higher by a minute quantity than slip determination speed $N_{SL}$. In a case where, for example, 450 rpm is set as slip determination speed $N_{SL}$, first reference speed NS1 is set to be, for example, 500 rpm which is slightly higher than slip determination speed $N_{SL}$.

Since post processing revolution speed Nf is smaller than instantaneous revolution speed Nm through the filter processing by means of revolution speed calculating section 504, first reference speed $N_{S1}$ prescribed for instantaneous revolution speed Nm is, correspondingly, set to be slightly higher than slip determination speed NSL prescribed for post processing revolution speed Nf. In addition, a revolution speed area related to zone B equal to or higher than first reference speed $N_{S1}$ is a revolution speed that can be generated in a case where the input shaft of CVT 7 is ordinarily started to revolve upon receipt of the torque of the power plant 1, 3. In the road wheel lock corresponding process, when a value before no input for a predetermined time is held even if the signal no input occurs, it conforms to the belt slip determination. Thus, in order to avoid this, the road wheel lock corresponding process is suspended.

In this way, with a difference from post processing revolution speed Nf taken into consideration, first reference speed $N_{S1}$ is, preferably, set to be higher by the minute quantity than slip determination speed $N_{SL}$. In addition, the minute quantity is preferably set with post processing revolution speed Nf smaller than instantaneous revolution speed Nm taken into consideration. It should be noted that only that first reference speed $N_{S1}$ is merely set to the vicinity speed of slip determination speed $N_{SL}$ has a constant effect in that it avoids the conform to the belt slip determination.

In addition, second reference speed $N_{S2}$ is set on a basis of a maximum value of instantaneous revolution speed Nm supposed to be enabled to be generated in a case where the input shaft of CVT7 is ordinarily started to be rotated upon receipt of the torque of the power plant. It should be noted that this second reference speed $N_{S2}$ is set to a certain revolution speed higher than line breakage determination revolution speed $N_{SN}$. For example, line breakage determination revolution speed $N_{SN}$ is set to approximately 1000 rpm and second reference speed $N_{S2}$ is set to approximately 1300 rpm. With post processing revolution speed Nf smaller than instantaneous revolution speed Nm taken into consideration, a situation in which the line breakage determination of revolution sensor 52 is erroneously carried out occurs. Instantaneous revolution speed Nm that cannot ordinarily be generated is not adopted in the calculation of revolution speed Nf but a previous value is held. Thus, the line breakage determination of revolution sensor 52 is not erroneously carried out.

The signal processing apparatus of the revolution sensor related to the preferred embodiment according to the present invention is structured as described above. For example, as shown in each flowchart of FIGS. 6 through 11, each processing is carried out. It should be noted that each processing of FIGS. 7 through 11 is repeatedly carried out at the set same control period (for example, 10 msec) until a control end, when a control start condition is established. It should be noted that the processing of FIG. 6 is carried out in an extremely shorter period than the control period of each processing of FIGS. 7 through 11.

Figure 6:
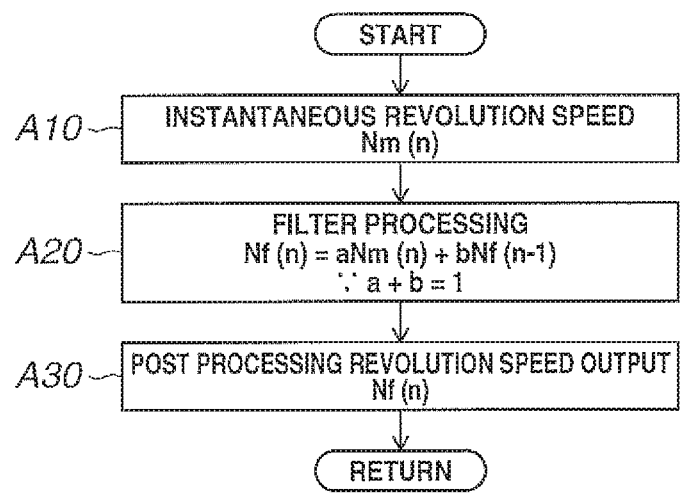
FIG. 6 is a flowchart for explaining a calculation of a revolution speed (post processing revolution speed) in the preferred embodiment.

First, the calculation of revolution speed (post processing revolution speed) Nf by revolution speed calculating section 504 is as follows:

As shown in FIG. 6, revolution speed calculating section 504 captures the present instantaneous revolution speed Nm(n) (a step A10), smoothes instantaneous revolution speed Nm(n) through the filter processing described, for example, in the equation (1) to calculate revolution speed Nf(n) (a step A20), and outputs this post processing revolution speed Nf(n) (a step A30).

Figure 7:
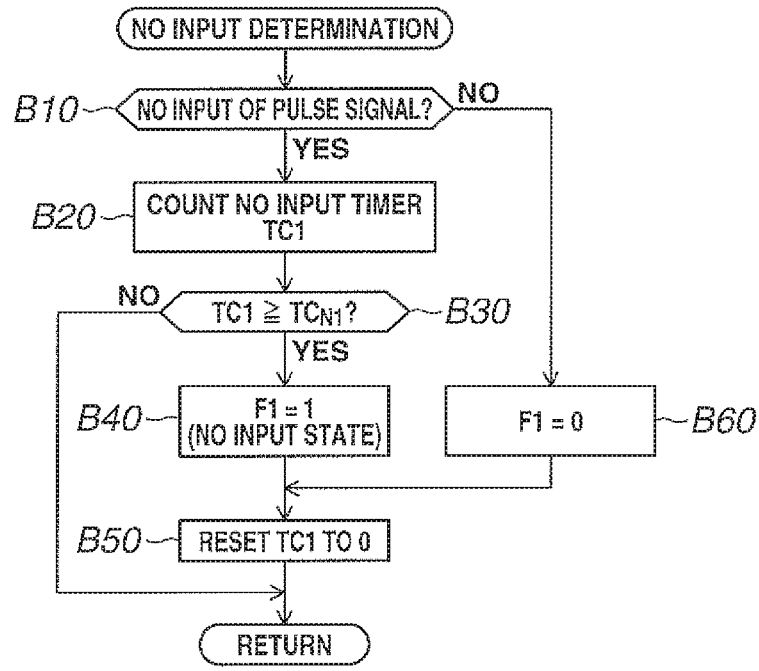
FIG. 7 is a flowchart for explaining a determination of no input state of a revolution sensor signal in the signal processing of the revolution sensor in the preferred embodiment.

Next, signal no input determining section 505, as shown in FIG. 7, determines whether no input of the pulse signal from revolution sensor 52 occurs (no pulse signal) (a step B10), counts a no input timer (count value is TC1) if no input of the pulse signal occurs (a step B20), and determines whether count value TC1 of the no input timer is equal to or larger than no input determination count value $TC_{N1}$ corresponding to no input determination time $T_{N1}$ (a step B30).

If count value TC1 is equal to or larger than no input determination count time $TC_{N1}$, signal no input determining section 505 sets a first flag F1 to 1 (a step B40) and resets count value TC1 to 0 (a step B50). "1" of first flag F1 indicates that no input state is decided and "0" of first flag F1 indicates that no input state is not decided.

If count value TC1 is not equal to or larger than no input determination count value $TC_{N1}$, a return is carried out from step B30. On the other hand, if the pulse signal is present, first flag F1 is reset to 0 (a step B60) and count value TC1 is reset to 0 (a step B50).

As described above, at each control period, a determination is made whether no input state is decided or not.

Figure 8:
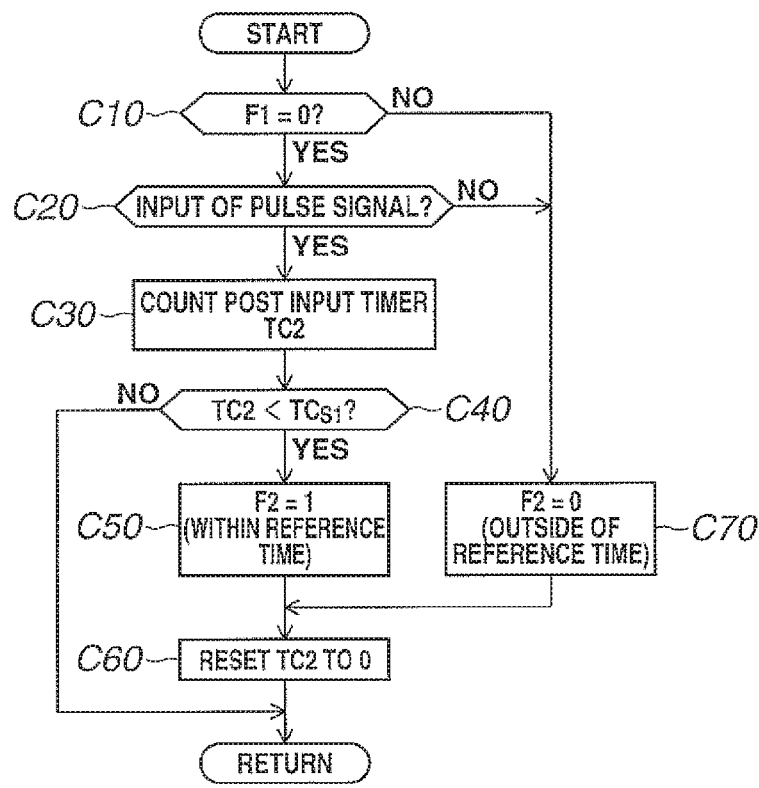
FIG. 8 is a flowchart for explaining a process division (division according to an elapsed time) of the signal processing of the revolution sensor in the preferred embodiment.

Next, time determining section 506a, as shown in FIG. 8, determines whether first flag F1 is 0 (a step C10). If first flag F1 is 0, time determining section 506a determines whether the input of the pulse signal occurs (the pulse signal is present) (a step C20). It should herein be noted that, if the pulse signal is present, the pulse signal is switched from the no input state to the input state. Time determining section 506a counts a post input timer (count value is TC2) (a step C30) and determines whether count value TC2 of the post input timer is equal to or larger than post input reference count value TCS1 corresponding to reference time $T_{S1}$ (a step C40).

Time determining section 506a sets a second flag F2 to 1 if count value TC2 is smaller than a post input reference count value $TC_{S1}$ (a step C50) and resets count value TC2 to 0 (a step C60). "1" of second flag F2 indicates that the elapsed time is within reference time $T_{S1}$ and "0" of second flag F2 indicates that the pulse signal is not present or the elapsed time is equal to or longer than reference time $T_{S1}$.

If count value TC2 is equal to or longer than post input reference count value $TC_{S1}$, the return is carried out from step C40. On the other hand, in a case where first flag F1 is not 0 or in a case where no input of the pulse signal occurs, time determining section 506a sets second flag F2 to 0 (a step S70) and resets count value TC2 to 0 (a step S60).

Figure 9:
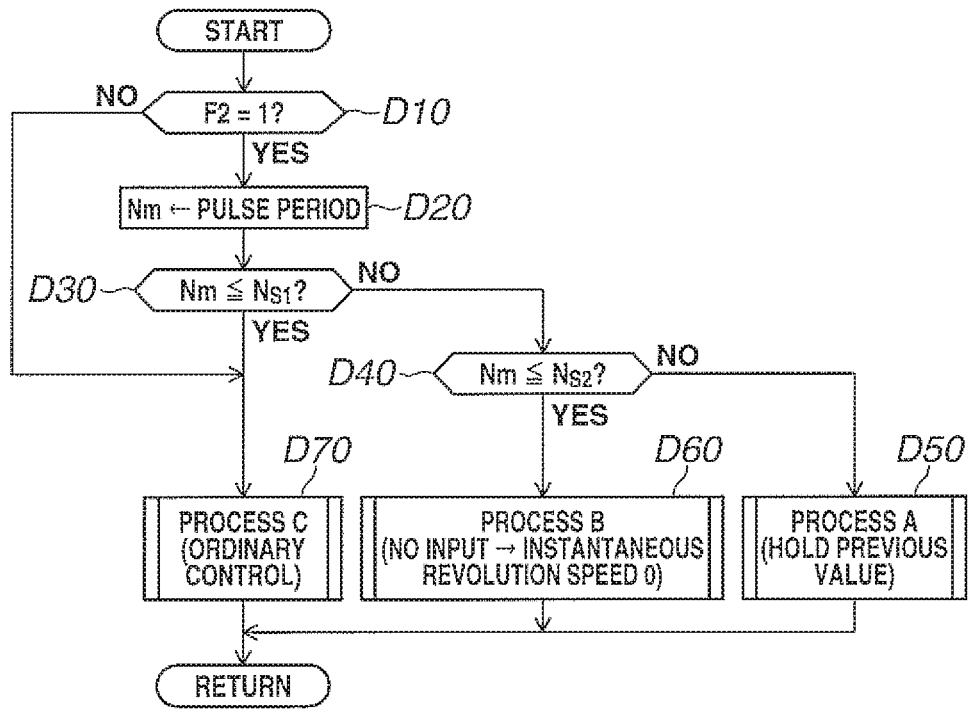
FIG. 9 is a flowchart for explaining the process division (division according to an instantaneous revolution speed) of the signal processing of the revolution sensor in the preferred embodiment.

Next, the processing of calculation operating section 508 is shown in FIG. 9. First, calculation operating section 508 determines whether second flag F2 is 1, namely, whether the elapsed time is within reference time $T_{S1}$ (a step D10). If second flag F2 is 1 (the elapsed time is within reference time $T_{S1}$), calculation operating section 508 calculates instantaneous revolution speed Nm from the pulse period (a step D20). Next, calculation operating section 508 compares instantaneous revolution speed Nm with first reference speed $N_{S1}$ and second reference speed $N_{S2}$ (steps D30 and D40).

If instantaneous revolution speed Nm is in a zone equal to or higher than second reference speed $N_{S2}$, calculation operating section 508 carries out a process A (holds previous post processing revolution speed Nf) (a step D50). If instantaneous revolution speed Nm is in a zone between first reference speed NS1 and second reference speed $N_{S2}$, calculation operating section 508 carries out a process B (thereafter, if no input of the pulse signal occurs, instantaneous revolution speed Nm is 0) (a step D60). If instantaneous revolution speed Nm is in a zone equal to or lower than first reference speed $N_{S1}$, calculation operating section 508 carries out a process C (ordinary control having the road wheel lock corresponding control) (a step D70). In addition, if the elapsed time is outside of reference time $T_{S1}$, calculation operating section 508 carries out process C (ordinary control having the road wheel lock corresponding control) (step D70).

Figure 10:
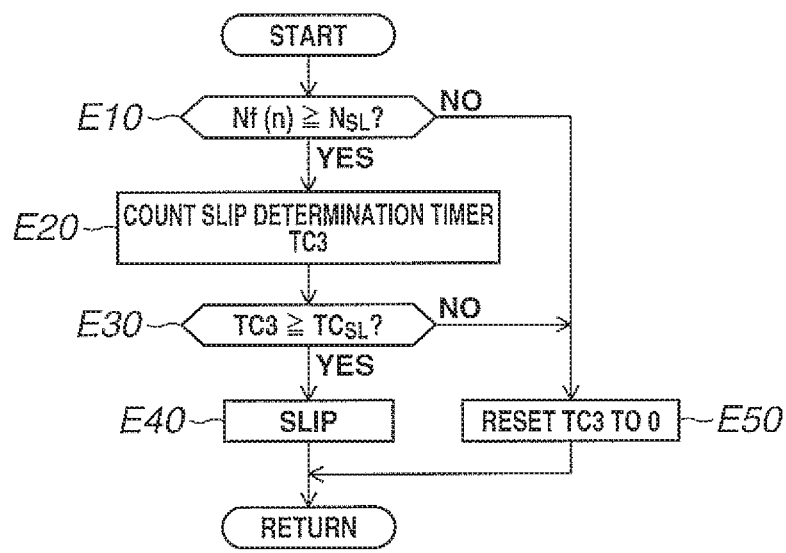
FIG. 10 is a flowchart for explaining a belt slip determination of a continuously variable transmission.

Next, the processing of slip determining section 501 is shown in FIG. 10. Slip determining section 501 determines whether, during the stop of vehicle 100, revolution speed Nf(n) of the input shaft (primary shaft) of CVT7 detected by revolution sensor 52 is equal to or higher than slip determination speed $N_{SL}$ (a step E10) and, if revolution speed Nf(n) is equal to or higher than slip determination speed $N_{SL}$, carries out the count of a slip determination timer (count value TC3) (a step E20).

Then, slip determining section 501 determines whether count value TC3 of the slip determination timer is continued for a count time equal to or longer than a slip determination count value $TC_{SL}$ corresponding to slip determination time $T_{SL}$ (a step E30) and, if count value TC3 of the slip determination timer is continued for the count value equal to or larger than slip determination count value $TC_{SL}$, determines that the belt slip occurs in CVT7 (a step S40). If revolution speed Nf(n) is not equal to or higher than slip determination speed $N_{SL}$, count value TC3 is reset to 0 (a step E50).

Figure 11:
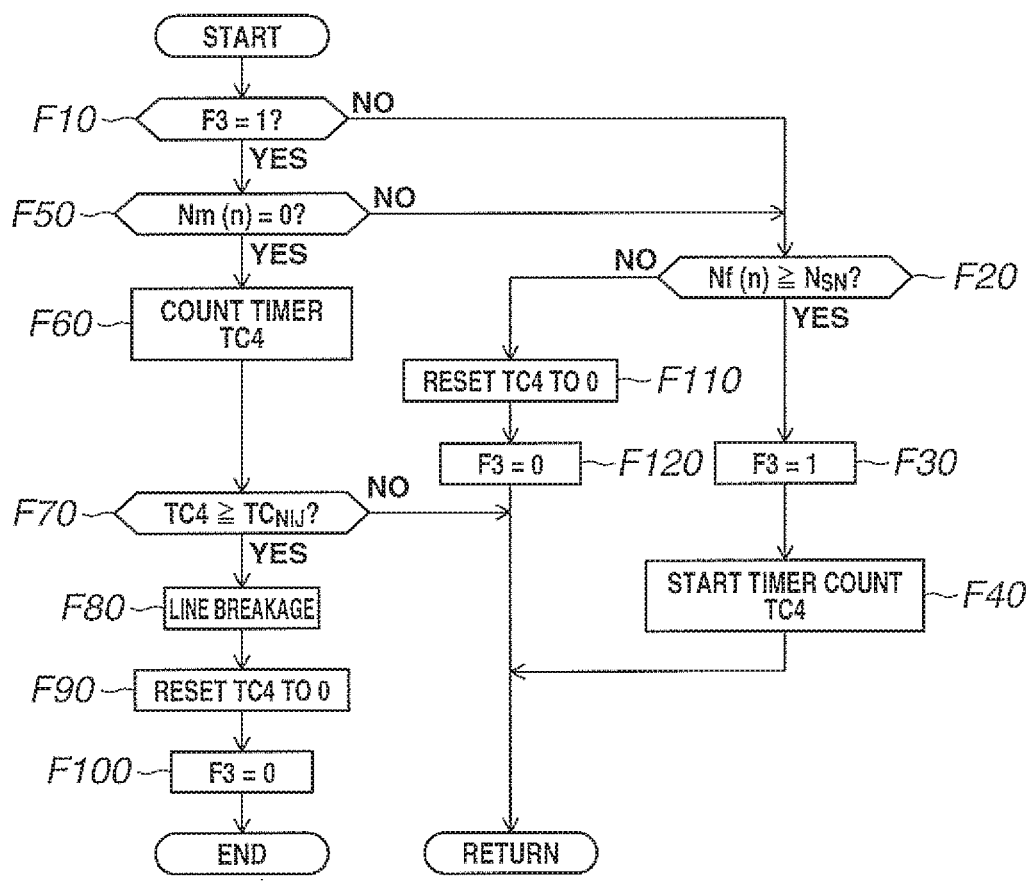
FIG. 11 is a flowchart for explaining a line breakage determination of the revolution sensor.

In addition, the processing of line breakage determining section 502 is shown in FIG. 11. First, line breakage determining section 502 determines whether a third flag F3 is 1 (a step F10). Third flag F3 is set to 1 when post processing revolution speed Nf(n) exceeds line breakage determination revolution speed $N_{SN}$, 1 is held when, thereafter, no input state of the pulse signal from revolution sensor 52 is determined, and third flag F3 is reset to 0 after the line breakage determination and the input of the pulse signal occurs before the determination of no input state of the pulse signal and post processing revolution speed Nf(n) does not exceed line breakage determination revolution speed $N_{SN}$.

If third flag F3 is not 1, line breakage determining section 502 determines whether post processing revolution speed Nf(n) exceeds line breakage determination revolution speed $N_{SN}$ (a step F20). If post processing revolution speed Nf(n) exceeds line breakage determination revolution speed $N_{SN}$, line breakage determining section 502 sets third flag F3 to 1 (a step F30), starts the count of a line breakage determination timer (count value TC4) from 0 (a step F40), and returns. If post processing revolution speed Nf does not exceed line breakage determination revolution speed $N_{SN}$, line breakage determining section 502 resets the count value of the line breakage determination timer to 0 (a step F110), resets third flag F3 to 0 (a step F120), and returns.

On the other hand, if third flag F3 is 1, line breakage determining section 502 determines whether instantaneous revolution speed Nm(n) is 0, namely, whether no input of the pulse signal from revolution sensor 52 occurs (a step F50). If instantaneous revolution speed Nm(n) is not 0, the routine goes to step F20 and the above-described processing is carried out. If instantaneous revolution speed Nm is 0, line breakage determining section 502 counts the line breakage determination timer (a step F60) and determines whether count value TC4 of the line breakage determination timer is equal to or larger than no input decision determination count value $TC_{NIJ}$ corresponding to no input decision determination time $T_{NIJ}$ (a step F70).

If count value TC4 of the line breakage determination timer is not equal to or larger than no input decision determination count value $TC_{NIJ}$, line breakage determining section 502 returns. If count value TC4 of the line breakage determination timer is equal to or larger than no input decision determination count value $TC_{NIJ}$, line breakage determining section 502 determines that no input state has decided and the line breakage occurs I revolution sensor 52 (a step F80). Thereafter, line breakage determining section 502 resets count value TC4 of the line breakage determination timer to 0 (a step F90), resets third flag F3 to 0 (a step F100), and finishes the line breakage determination.

In this way, the determination of the belt slip of CVT7 and the determination of the line breakage in revolution sensor 52 are made on a basis of post processing revolution speed Nf and instantaneous revolution speed Nm. In the ordinary control, with the pulse signal no input during the road wheel lock taken into consideration, the road wheel lock corresponding process in which the revolution speed immediately before no input of the pulse signal is held is carried out provided that a continuation of no input of the pulse signal is within a predetermined time (road wheel lock corresponding time) $T_{WL}$. Thus, an influence on the determination based on the value of the post processing revolution speed caused by the pulse signal no input due to the road wheel lock and other controls can be avoided.

On the other hand, in a case where the high speed instantaneous revolution speed Nm is calculated when the pulse signal of the short period due to the swinging back operation of sensing rotor 52b caused by the abrupt variation of the torque of the power plant is inputted, a particular operation is carried out for post processing revolution speed Nf and instantaneous revolution speed Nm. Thus, the erroneous determinations are avoided.

In other words, since the input of the pulse signal due to the abrupt variation of the torque of the power plant is instantaneous, the limitation is placed on a case where the elapsed time from a time at which the pulse signal is switched from no input state to the input state reaches to first reference time T1. Thus, with the limitation placed on the case where the elapsed time reaches to first reference time T1, instantaneous revolution speed Nm is compared with first reference speed $N_{S1}$ and second reference speed $N_{S2}$.

Then, the particular process for process A and process B is carried out in accordance with a magnitude of instantaneous revolution speed Nm.

When instantaneous revolution speed Nm provides a value in the zone equal to or higher than second reference speed $N_{S2}$ which cannot ordinarily be generated, the determination of the input of the pulse signal due to the abrupt variation of the torque is made, this instantaneous revolution speed is not counted in the calculation of the revolution speed, and the process A in which the immediately prior revolution speed value is held is carried out. Thus, an excessive post processing revolution speed Nf due to an excessive instantaneous revolution speed Nm is prevented from being erroneously calculated. The influence on the determination based on post processing revolution speed Nf and the control is avoided. Particularly, such a case occurs where the excessive post processing revolution speed Nf exceeds line breakage determination revolution speed $N_{SN}$, the erroneous determination of the line breakage of revolution sensor 52 is avoided.

When, until the elapsed time reaches to first reference time T1, instantaneous revolution speed Nm provides a value of the zone between first reference speed $N_{S1}$ and second reference speed $N_{S2}$, the road wheel lock corresponding control is not carried out but the process B in which, when no input of the pulse signal occurs, 0 as the instantaneous revolution speed is instantaneously inputted to the revolution speed calculating means is carried out. Since first reference speed $N_{S1}$ is slightly higher than slip determination speed $N_{SL}$, if the road wheel lock corresponding control is carried out, the immediately prior revolution speed by road wheel lock corresponding time $T_{WL}$ is held. Hence, during the vehicle stop, the state in which the revolution speed of the input shaft is equal to or higher than the slip determination speed is continued for a time equal to or longer than slip determination time $T_{SL}$. Thus, the erroneous determination that the slip occurs in the belt is made. However, since process B is carried out, the erroneous determination of the belt slip can be avoided.

As described above, the preferred embodiment according to the present invention has been explained.

However, the present invention is not limited to the preferred embodiment. The above-described preferred embodiment may appropriately be modified and may be carried out by adopting a part.

For example, in the above-described embodiment, the power plant is constituted by engine 1 and MG3. However, the power plant is not limited to this. The present invention may widely be applied when the pulse signal inputted from the revolution sensor is processed, in a vehicle in which, in the belt type continuously variable transmission whose input shaft is interruptedly connected to at least power plant via the clutch, the revolution sensor detecting the revolution speed of the input shaft, when the state in which, during the vehicle stop, the revolution speed of the input shaft is equal to or higher than slip determination speed $N_{SL}$ is continued for a time equal to or longer than slip determination time $T_{SL}$, the belt slip occurs in the belt type continuously variable transmission.

In addition, the revolution sensor is not limited to the electromagnetic type if the revolution sensor outputs the pulse signal. For example, an optical type revolution sensor may be used or various types revolution sensors may be applied.

It should be noted that, although the preferred embodiment does not refer to, in a case where a time point at which the pulse signal is inputted is during the determination of the line breakage of the revolution sensor and before the line breakage is decided, it is preferable to carry out process C assuming that a normal pulse determination is made.

The invention claimed is:

1. A signal processing apparatus of a revolution sensor for processing a pulse signal inputted from the revolution sensor, the signal processing apparatus being equipped in a vehicle having a power plant, a belt continuously variable transmission whose input shaft is interruptibly connected to the power plant via a clutch, the revolution sensor detecting a revolution of the input shaft, and slip determining means for determining a belt slip occurs in the belt continuously variable transmission when, during a stop of the vehicle, a state in which a revolution speed of the input shaft is equal to or higher than a slip determination speed $N_{SL}$ is continued for a time equal to or longer than a slip determination time $T_{SL}$ and the signal processing apparatus comprising:

instantaneous revolution speed calculating means for calculating an instantaneous revolution speed Nm of the input shaft from a period in which the pulse signal is inputted;

revolution speed calculating means for smoothing the instantaneous calculating speed Nm through a filter processing to calculate the revolution speed Nf;

time calculating means for calculating an elapsed time from a no input state of the pulse signal to an input state of the pulse signal in a case where the pulse signal becomes no input continuously for a no input state determination time $T_{N1}$;

instantaneous revolution speed determining means for comparing the instantaneous revolution speed Nm with a first reference speed $N_{S1}$ which is a vicinity speed of the slip determination speed $N_{SL}$ and a second reference speed $N_{S2}$ which is higher than the first reference speed $N_{S1}$; and calculation operating means for operating a calculation of the revolution speed calculating means on a basis of the elapsed time and instantaneous revolution speed Nm during a release of the clutch, wherein the calculation operating means, after a time at which the elapsed time has reached to a reference time $T_{S1}$, holds an immediately prior revolution speed Nf to the revolution speed calculating means until a continued time of a no input exceeds a road wheel lock corresponding time $T_{WL}$ set to correspond to a road wheel lock and which is longer than the slip determination time $T_{SL}$ when the no input of the pulse signal occurs and, when the continued time of the no input exceeds the road wheel lock corresponding time $T_{WL}$, carries out a road wheel lock corresponding process in which 0 as the instantaneous revolution speed Nm is inputted to the revolution speed calculating means, while the elapsed time has reached to reference time $T_{S1}$, carries out the road wheel lock corresponding process in a case where the determining means determines that the instantaneous revolution speed Nm is in a zone equal to or lower than the first reference speed $N_{S1}$, inputs 0 as the instantaneous revolution speed Nm to the revolution speed calculating means when the no input of the pulse signal occurs in a case where the determining means determines that the instantaneous revolution speed Nm is in a zone between the first reference speed $N_{S1}$ and the second reference speed $N_{S2}$, and holds a value of the revolution speed Nf calculated immediately before to the revolution speed calculating means in a case where the determining means determines that the instantaneous revolution speed Nm is in a zone equal to or higher than the second reference speed $N_{S2}$.

2. The signal processing apparatus of the revolution sensor as claimed in claim 1, wherein the reference time $T_{S1}$ is set to include a time range in which the pulse signal of a short period which is generated when, during a release of the clutch, the input shaft is instantaneously revolved by a minute quantity when an abrupt variation of a torque of the power plant is transmitted to the input shaft can be generated, the first reference speed $N_{S1}$ is set to be higher than the slip determination speed $N_{SL}$ by a minute quantity, and the second reference speed $N_{S2}$ is set on a basis of a maximum value of the instantaneous revolution speed Nm which can be generated in a case where the input shaft is ordinarily started to be revolved upon receipt of the torque of the power plant.

3. The signal processing apparatus of the revolution sensor as claimed in claim 1, wherein the signal processing apparatus further comprises line breakage determining means for determining that a line breakage occurs in the revolution sensor when the no input state of the pulse signal is decided from a time at which the revolution speed exceeds a line breakage determination revolution speed $N_{SN}$ and the second reference revolution speed $N_{S2}$ is set to be higher than the line breakage determination revolution speed $N_{SN}$ and is set in such a way that the revolution speed Nf obtained by filter processing the instantaneous revolution speed Nm through the revolution speed calculating means based on the pulse signal of the short period generated when, during the release of the clutch, the abrupt variation of the torque of the power plant is transmitted to the input shaft and the input shaft is instantaneously revolved by the minute quantity becomes equal to or lower than the line breakage determination revolution speed $N_{SN}$.

4. The signal processing apparatus of the revolution sensor as claimed in claim 1, wherein the power plant includes an engine for which an internal combustion engine is used and an electric motor connected to the engine via a first clutch and a second clutch as the clutch is intervened between an output shaft of the electric motor and the input shaft of the belt continuously variable transmission, the first clutch and the second clutch having a slip engagement mode in addition to an engagement mode and a release mode.

* * * * *